United States Patent [19]

Yokota

[11] Patent Number: 4,499,571

[45] Date of Patent: Feb. 12, 1985

[54] OPTICAL DISK SYSTEM WITH LASER SAFETY ARRANGEMENT

[75] Inventor: Tsuneshi Yokota, Kawasaki, Japan

[73] Assignee: Tokyo Shibaura Denki Kabushiki, Kawasaki, Japan

[21] Appl. No.: 373,784

[22] Filed: Apr. 30, 1982

[30] Foreign Application Priority Data

May 1, 1981 [JP] Japan .................................. 56-66471

[51] Int. Cl.³ .............................................. G11B 7/00
[52] U.S. Cl. ........................................ 369/54; 369/58; 369/243
[58] Field of Search ....................... 369/48, 53, 54, 58, 369/243, 233; 358/342; 250/557

[56] References Cited

U.S. PATENT DOCUMENTS

| | | | |
|---|---|---|---|
| 4,032,971 | 6/1977 | Camerik | 369/111 |
| 4,196,907 | 4/1980 | Takizawa et al. | 369/200 |
| 4,376,305 | 3/1983 | Dennis et al. | 369/243 |

FOREIGN PATENT DOCUMENTS

| | | |
|---|---|---|
| 5267302 | 3/1977 | Japan . |
| 52131707 | 4/1977 | Japan . |
| 38663 | 3/1980 | Japan .................................... 369/54 |
| 1498793 | 7/1974 | United Kingdom . |

Primary Examiner—Donald E. McElheny, Jr.
Attorney, Agent, or Firm—Cushman, Darby & Cushman

[57] ABSTRACT

An optical disk apparatus has a detector for detecting absence of an optical disk in a prescribed position, a detection circuit for detecting non-rotation of the disk and an AND circuit for producing a logical product of the outputs from the detector and detection circuit. The detector comprises a light-emitting diode and a light-receiving element. An output signal from the AND circuit is supplied to a beam source driver/control circuit, thereby turning off a beam source.

6 Claims, 2 Drawing Figures

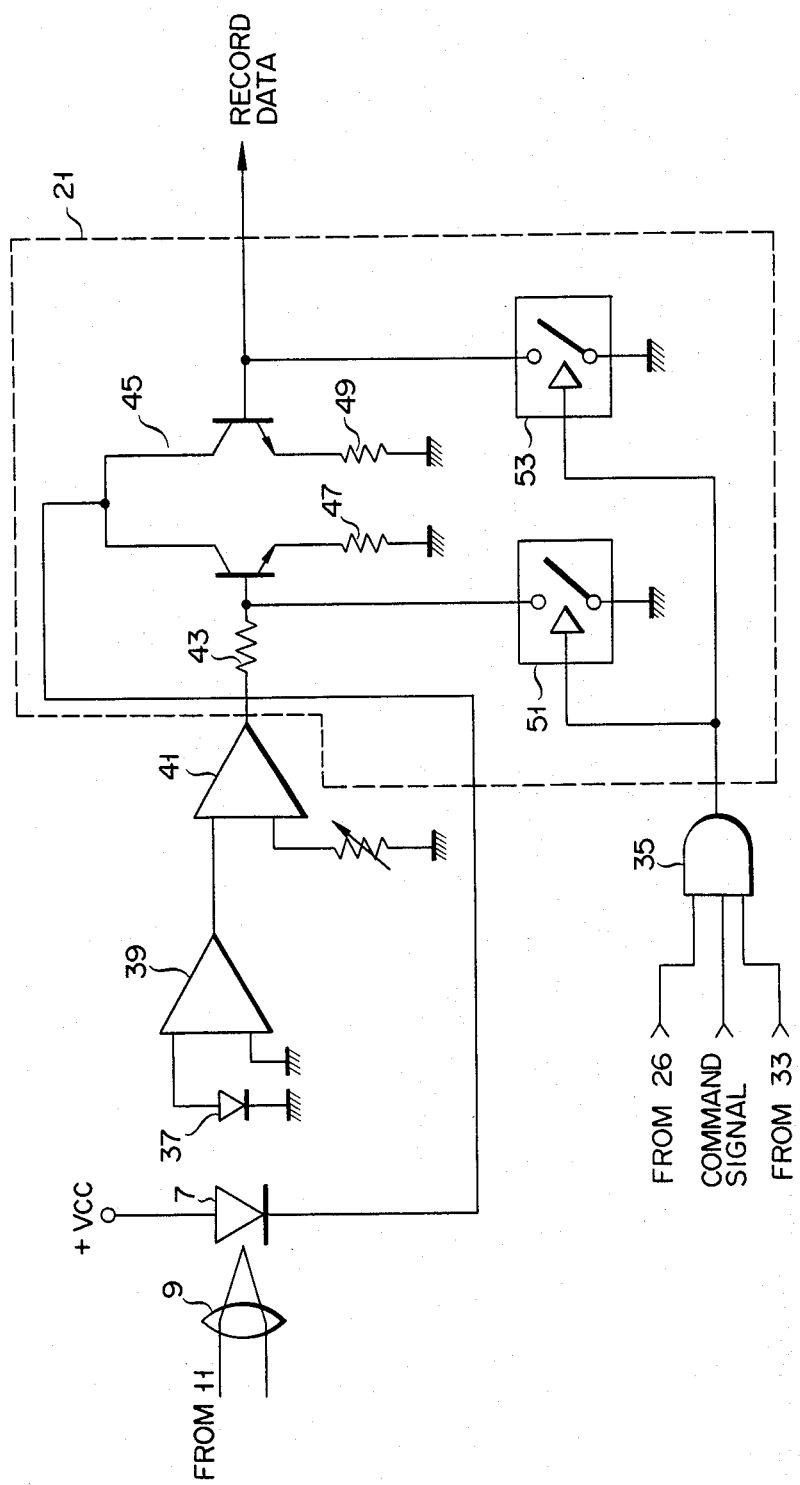
F I G. 2

OPTICAL DISK SYSTEM WITH LASER SAFETY ARRANGEMENT

BACKGROUND OF THE INVENTION

This invention relates to an optical disk apparatus which records video data on, and retrieve the video data from, a spinning disk by illuminating the disk with a laser beam.

An optical disk apparatus of this type is known as a record/playback system of a high recording density. The optical disk apparatus under ongoing development use disks having a higher photosensitivity so as to record video data at a high speed or by using a lowenergy laser beam. A variety of techniques have been proposed not only to raise the photosensitivity of a recording layer of a disk but also to suppress the dissipation of the optical energy concentrated in the recording layer.

With some of the known optical disk apparatus an intense laser beam is used to record data on a disk and a somewhat less intense laser beam is used to retrieve the data from the disk. Even if a less intense beam is applied on the disk to retrieve the data, an extremely large optical energy will be concentrated at a portion of the disk unless the disk is spinning. The concentrated optical energy would deform the recording layer or, in the worst case, break the recording layer. If the portion of the disk is a recorded portion, the data recorded therein will inevitably be destroyed.

Most optical disk apparatus use a laser beam having a diameter of about one micron. The optical energy applied on a disk is therefore extremely large. In other words, the optical energy is much concentrated on the disk in both time and space. In addition, the laser beam, which is generated by amplifyting light waves about $10^5$ times, will detach or destroy the retinas if it enters the eyes of a user. In most of the existing optical disk apparatus a disk takes a horizontal position because it can be more easily placed or detached than in case it takes other positions. The lower surface of the disk placed in the horizontal position is illuminated with a laser beam, whereby data are recorded or retrieved. A playback-only disk stores data in its aluminum recording layer, and record/playback disk has a sandwich structure comprised of thin metal layers. Thus, as long as the disk of either type is attached to the apparatus and put in the horizontal position, the laser beam cannot leak from the apparatus. When the disk is removed from the apparatus, however, the beam may leak and may enter the eyes of the user. This would be a very dangerous situation.

SUMMARY OF THE INVENTION

It is an object of the present invention to provide an optical disk apparatus in which a laser beam source is turned off when a disk does not spin or is not attached, whereby the disk is not deformed or broken, data recorded on the disk are not destroyed, and no laser beam leaks.

An optical disk apparatus according to the invention has an optical disk, a motor for spinning the disk and an optical head for emitting a laser beam. The laser beam illuminates the disk, thereby to record data on the disk and retrieve data from the disk. The apparatus is improved by further comprising a first detection means for detecting the non-rotation of the disk, a second detection means for detecting the absence of the disk, and a control means connected to the first and second detection means for turning off a laser beam source in response to output signals from the first and second detection means.

BRIEF DESCRIPTION OF THE DRAWINGS

Other objects and features of the present invention will be apparent from the following description taken in connection with the accompanying drawings, in which:

FIG. 2 is a circuit diagram of a circuit for controlling and driving a laser beam source shown in FIG. 1.

DETAILED DESCRIPTION OF THE PREFERRED EMBODIMENT

Figure 1:
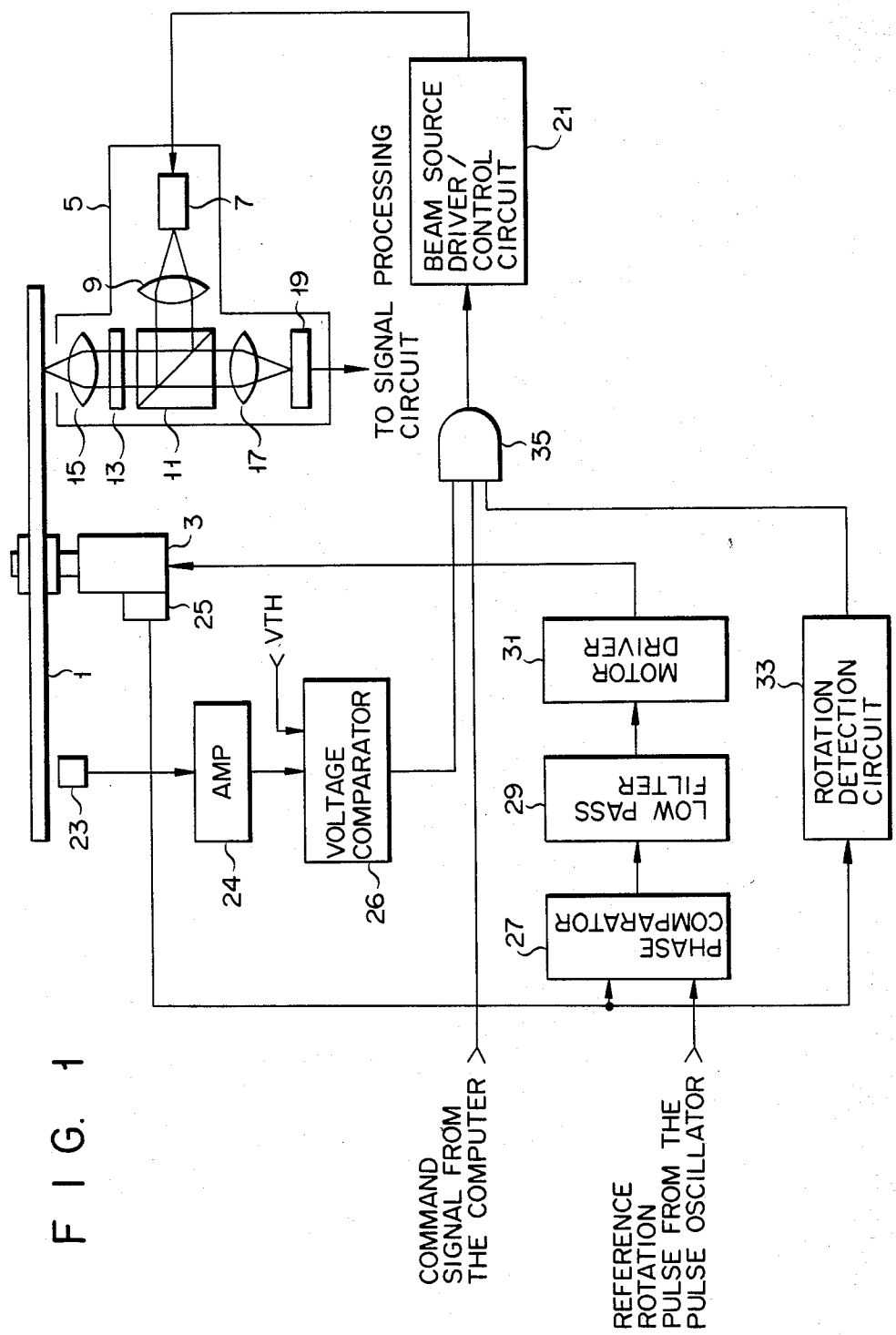
FIG. 1 is a block diagram of an optical disk apparatus, an embodiment of the present invention.

FIG. 1 shows an optical disk apparatus according to the invention, which has an optical disk 1 and a motor 3 for spinning the disk 1. The apparatus further comprises an optical head 5 for recording data on the disk 1 and retrieving data from the disk 1, a semiconductor laser oscillator 7, a collimator lens 9, a polarizing beam splitter 11, a quarter-wave plate 13, an objective lens 15, a condensing lens 17 and a beam detector 19. The apparatus is provided with a beam source driver/control circuit 21. The circuit drives and controls the laser oscillator 7, and its output beam may have its intensity changed. That is, the oscillator 7 may generate an intense laser beam for illuminating the disk 1 thereby to record data and a less intense laser beam for illuminating the disk 1 thereby to retrieve data. A laser beam from the oscillator 7 is converted by the collimator lens 9 into a parallel beam. The parallel beam is guided to the objective lens 15 through the polarizing beam splitter 11 and the quarter-wave plate 13. The parallel beam is then focused by the lens 15 so that its diameter is reduced to about one micron when it reaches the lower surface of the optical disk 1. A beam reflected from the lower surface of the disk 1 is guided to a condensing lens 17 through the objective lens 15, the quarter-wave plate 13 and the polarizing beam splitter 11. The beam is thus focused by the lens 17 onto the beam detector 19. The beam detector 19 converts the beam into an electric signal, which is supplied to a signal processing circuit (not shown) and used as a retrieved data or a focus control signal. The optical head 5 may be moved by a linear motor mechanism (not shown), linearly in the radial direction of the optical disk 1.

As shown in FIG. 1, the apparatus further comprises a detector 23 of non-contact type for detecting whether or not the disk 1 is placed in the prescribed position. The detector 23 is of the ordinary reflection type that comprises a light-emitting diode and a light-receiving element. This is because the disk 1 is either one having a aluminum recording layer or one having metal layers. An output signal of the detector 23 is amplified by an amplifier 24, the output of which is supplied to a voltage comparator 26. The comparator 26 compares the input signal with a threshold voltage. The input signal has a level higher than the threshold voltage when the disk 1 is attached. When the level of the input signal is higher than the threshold voltage, the comparator 26 supplies a logic "1" signal to an AND circuit 35.

A pulse generator 25 is connected to a motor 3. As the motor 3 rotates, the pulse generator 25 generates a pulse signal whose frequency is proportional to the velocity of rotation of the motor 3. The pulse signal is supplied to a phase comparator 27, which receives a reference pulse signal of a predetermined frequency from another pulse generator (not shown). The comparator 27 compares the phases of the pulse signals from the pulse generators 25 and 27 and produces a pulse whose width is proportional to the phase difference between the input pulse signals. Either pulse generator may be a voltage controlled oscillator (VCO) which is connected to receive control data from a microcomputer (not shown), e.g. microcomputer 8085 of Intel Corporation, U.S.A. The output pulse from the phase comparator 27 is supplied to a low-pass filter 29, and its high-frequency component and noise, both being unnecessary, are removed. The pulse is then supplied to a motor driver 31. In response to the pulse and a start-stop command signal supplied from a main control section comprised of the microcomputer, the motor driver 31 drives the motor 3. The pulse generator 25, phase comparator 27, low-pass filter 29 and motor driver 31 constitute a motor rotation control circuit using a phase-locked circuit.

Further, the apparatus of FIG. 1 includes a rotation detection circuit 33. The circuit 33 is connected to receive an output pulse signal from the pulse generator 25. Hence, according to the presence or absence of a pulse signal the circuit 33 detects whether or not the motor 3 and thus the disk 1 are rotating. When the motor 3 is rotating, the detection circuit 33 generates a logic "1" signal. The logic "1" signal is supplied to the AND circuit 35. The AND circuit 35 obtains the logic product of the output from the detector 23, the command signal and the output from the circuit 33. An output of the AND circuit 35 is supplied to the beam source driver/control circuit 21.

Upon receipt of a logic "1" signal from the AND circuit the beam source driver/control 21 starts driving the laser oscillator 7. According to a beam intensity changing signal, which is supplied at the start of every data recording period, the circuit 21 causes the laser oscillator 7 to modulate the output laser beam.

FIG. 2 shows the beam source driver/control circuit 21 in detail and its peripheral circuits. An output from the semiconductor laser oscillator 7 is detected by an light-receiving element 37. Then, the element 37 generates an output signal, which is amplified by an amplifier 39 and is then supplied to an error amplifier 41. The error amplifier 41 generates an error signal, which is supplied to a transistor pair 45. The transistor pair 45 consists of two transistors the collectors of which are mutually connected, the emitters of which are grounded respectively through resistors 47 and 49, and the bases of which are connected respectively to analog switches 51 and 53. The analog switches 51 and 53 are connected to receive an output signal from the AND circuit 35. The junction of the collectors of the transistors is connected to the semiconductor laser oscillator 7. The output from the junction may therefore be fed back to the oscillator 7.

When the AND circuit 35 generates a logic "0" signal, both analog switches 51 and 53 are closed. The transistor pair 45 is thus rendered non-conductive, whereby the driving current for the oscillation is not supplied to the semiconductor laser oscillator 7. The oscillator 7 therefore generates no laser beam. Conversely, when the AND circuit 35 generates a logic "1" signal, both analog switches 51 and 53 are opened, thus the driving voltage from the error amplifier 41 is supplied to one of the transistor pair 45. Therefore, the current is supplied to the laser oscillator 7 through the transistor. Consequently, the laser oscillator 7 emits a laser beam. Furthermore, the recording of the data is possible.

Now it will be described how the apparatus of FIGS. 1 and 2 operates. In order to record data on the disk 1 a command signal having a logic "1" level is supplied. Then, the motor driver 31 comes into operation, thus driving the motor 3. As a result, the pulse generator 25 starts generating a pulse signal, and the detector 33 generates a logic "1" signal. If the disk 1 is attached at this time, the output from the detector 23 has a logic "1" level. In this case, the AND circuit 35 generates a logic "1" signal. In consequence, the analog switches 51 and 53 are opened, thereby supplying the voltage to each base of the transistor pair 45. The transistor pair 45 is rendered conductive, and the current necessary for the oscillation is applied to the semiconductor laser oscillator 7. The laser oscillator 7 therefore comes into operation. At the same time, the laser oscillator 7 is so controlled that the laser beam it emits is modulated. The modulated laser beam is focused by the objective lens 15 onto the disk 1, thus forming pits in the recording layer of the disk 1 and thus recording data on the disk 1.

If the motor 3 stops rotating due to an erroneous operation made by the user or would not start due to a trouble of itself, the pulse generator 25 generates no pulse signal. In this case, the output from the detection circuit 33 has a logic "0" level. The output of the AND circuit 35 has a logic "0" level, too. As a result, both analog switches 51 and 53 are closed, whereby the transistor pair 45 is made non-conductive and the current is not supplied to the semiconductor laser oscillator 7. The laser oscillator 7 therefore stops emitting a laser beam. In this way the emission of a laser beam is stopped when the disk 1 is not rotated or stops rotating. A laser beam never illuminates the same portion of the disk 1 for so long a time that the recording layer of the disk 1 may be deformed or damaged.

If the disk 1 is not attached when the motor 3 starts rotating, the output from the detector 23 has a logic "0" level. Then, the output from the AND circuit 35 has a logic "0" level and the beam source driver/control circuit 21 does not come into operation. Therefore, the semiconductor laser oscillator 7 generates no laser beam. When the disk 1 is removed during the recording period, the level of the output from the detector 23 changes to "0". As a result, the output from the AND circuit 35 comes to have a logic "0" level and the beam source driver/control circuit 21 stops operating. Consequently, the semiconductor laser oscillator 7 stops emitting a laser beam. In this way, the emission of a laser beam is stopped when the disk 1 is not attached or removed. A laser beam would never leak outside the apparatus.

Thus far it has been described how the apparatus of FIGS. 1 and 2 operates to record data on the disk 1. To retrieve data from the disk 1 the apparatus operate in a similar manner, preventing the disk 1 from being deformed or damaged and the recorded data from being destroyed and avoiding a leak of a laser beam.

What is claimed is:

1. An optical disk apparatus having an optical disk, a motor for rotating the disk and an optical head for emitting a laser beam, in which a laser beam illuminates the disk thereby to record data on the disk and read out data from the disk, the improvement comprising:

(a) first detection means for detecting non-rotation of the disk;

(b) second detection means for detecting absence of the disk in a prescribed position; and (c) control means electrically connected to the first and second detection means for turning off a laser beam source in response to output signals from the first and second detection means.

2. An optical disk apparatus according to claim 1, wherein said first detection means has a pulse generator connected to said motor and detects upon receipt of a pulse signal from the pulse generator whether or not said motor is rotating.

3. An optical disk apparatus according to claim 1, wherein said second detection means comprises a light-emitting diode for emitting light to said disk and a light-receiving element for receiving light reflected from said disk.

4. An optical disk apparatus having an optical disk, a motor for rotating the disk and an optical head for emitting a laser beam, in which a laser beam illuminates the disk thereby to record data on the disk and retrieve data from the disk, the improvement comprising:

(a) detection means for detecting non-rotation of said disk; and (b) control means electrically connected to said detecting means for turning off a laser beam source in response to an output signal from the detecting means.

5. An optical disk apparatus according to claim 4, wherein said detection means has a pulse generator connected to said motor and detects upon receipt of a pulse signal from the pulse generator whether or not said motor is rotating.

6. In an optical disk apparatus having an optical disk, a motor for rotating the disk and an optical head for emitting a laser beam, in which a laser beam illuminates the disk thereby to record data on the disk and read out data from the disk, the improvement comprising:

(a) detection means for detecting absence of the disk in a prescribed position, the detection means including a light-emitting diode for emitting light to said disk and a light-receiving element for receiving light reflected from said disk; and (b) control means electrically connected to said detecting means for turning off a laser beam source in response to an output signal from the detection means.

* * * * *